United States Patent [19]

Bovenlander et al.

[11] Patent Number: 4,932,252
[45] Date of Patent: Jun. 12, 1990

[54] METHOD AND DEVICE FOR TESTING AN ANTI-SKID BRAKING SYSTEM (ABS) OF A MOTOR VEHICLE

[75] Inventors: Johannes P. Bovenlander, Muiden; Maarken Molenaar, Badhoevedorp, both of Netherlands

[73] Assignee: Sun Electric Systems B.V., Netherlands

[21] Appl. No.: 156,815

[22] Filed: Feb. 17, 1988

[30] Foreign Application Priority Data

Feb. 17, 1987 [NL] Netherlands .......................... 8700401

[51] Int. Cl.⁵ .............................................. G01L 5/28
[52] U.S. Cl. ...................................................... 73/123
[58] Field of Search ..................................... 73/123–126

[56] References Cited

U.S. PATENT DOCUMENTS

| | | | |
|---|---|---|---|
| 3,473,374 | 10/1969 | Leeper | 73/124 |
| 3,952,589 | 4/1976 | Gevl | 73/123 |
| 3,965,732 | 6/1976 | Cline | 73/126 |
| 4,050,299 | 10/1977 | Maxwell | 73/126 |

FOREIGN PATENT DOCUMENTS 2447210 8/1976 Fed. Rep. of Germany .
3606118 8/1987 Fed. Rep. of Germany ........ 73/123

*Primary Examiner*—Robert R. Raevis

[57] ABSTRACT

Method and device for testing an anti-skid braking system (ABS) of a motor vehicle, using a roller test bench with at least four rollers or pairs of rollers. These rollers are put into rotation by the roller bench and braked by the brakes of the vehicle. A difference in speed of rotation between at least one of the (pairs of) rollers and the other(s) is brought about by the roller bench. During the braking, the response of the anti-skid system to this difference in speed is observed.

13 Claims, 1 Drawing Sheet

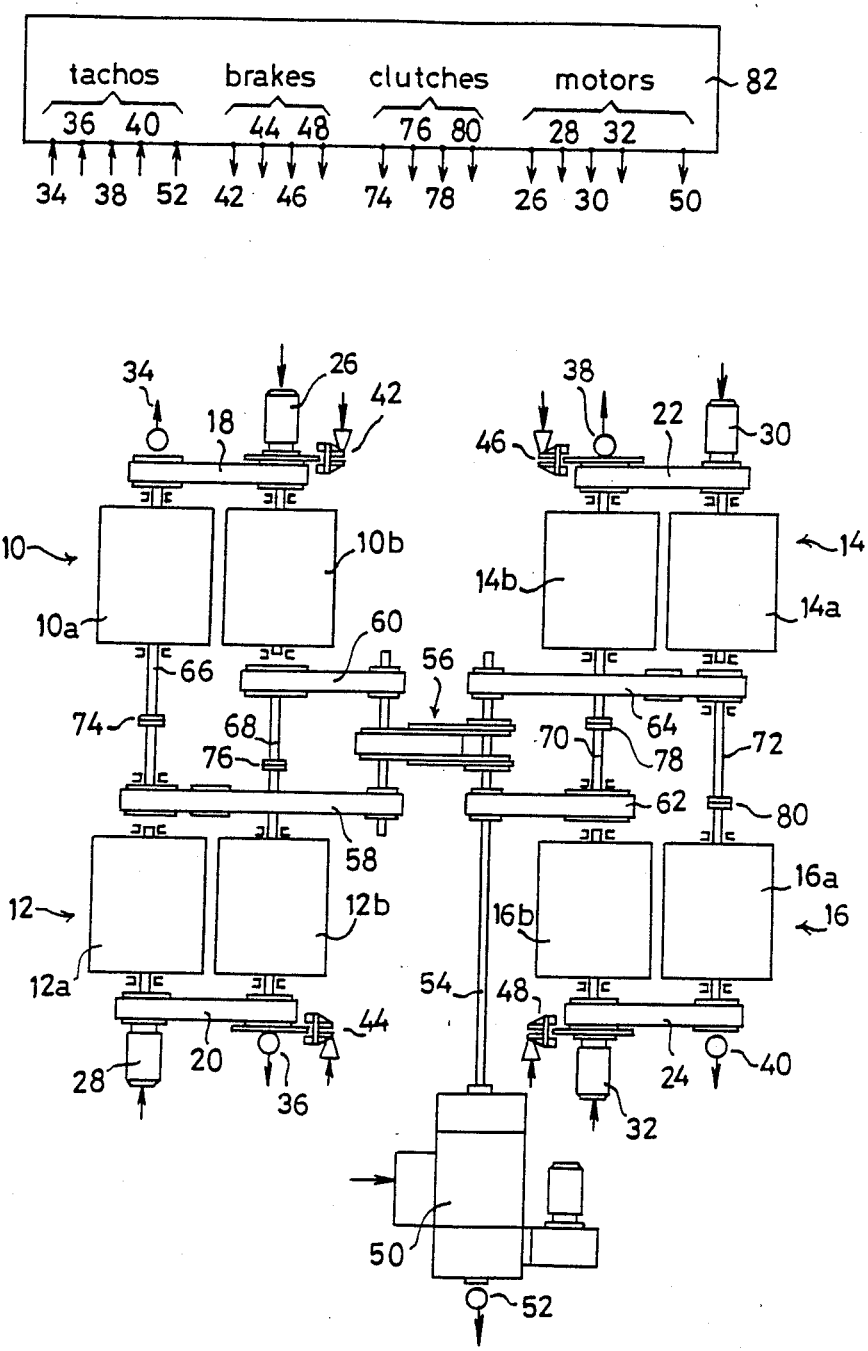

METHOD AND DEVICE FOR TESTING AN ANTI-SKID BRAKING SYSTEM (ABS) OF A MOTOR VEHICLE

BACKGROUND OF THE INVENTION

This invention relates to a method and device for testing an anti-skid braking system (ABS) for a motor vehicle, using a roller test bench with at least four rollers or pairs of rollers which can be put into rotation by the roller test bench and braked by means of the brakes of the vehicle.

DESCRIPTION OF THE PRIOR ART

It is known that a complete test of the brakes of a motor vehicle provided with an anti-skid braking system is not possible in the usual way when using a roller test bench, since the ABS always prevents the lock-up of the individual wheels from being reached or exceeded. The fact that this lock-up a particular wheel is not reached can be due either to the action of the ABS or to a wheel brake which is not functioning properly or being activated improperly.

The existing ABS testing equipment is therefore connected directly to the control circuits of the ABS and delivers simulation signals to it. However, this method of testing has various disadvantages, the main one being that the fitting and removal of the many connections for the numerous test stages is very time-consuming and must be carried out accurately by avoiding making the wrong connections, or the test can be faulty because the connections are damaged. Also, the ABS cannot be tested as a whole, but only part by part.

The German patent appication DE-A-2 447 210 discloses a roller testing stand with two pairs of in-line rollers which each can be driven through adjustable slip couplings with an adjustable, predetermined torque. The device is provided with sensors, which sense an occurring lock-up of a driven wheel. When such a lock-up occurs, it indicates that the anti-skid device, whose purpose is exactly to prevent such a lock-up, is not working correctly.

Furthermore, the U.S. Pat. No. 4,050,299 discloses a roller testing stand with two pairs of in-line rollers, each with their own driving motor. During use of this roller testing stand, initially both pairs of rollers are driven. When the brakes are applied, one of the driving motors is switched off, simulating a slippery surface for the wheel resting in the roller which is not driven anymore. The way in which the speed of the rollers decays, and more particularly, the way in which the lock-up of the non-driven roller is prevented, gives a rough indication about the function of the system.

The big disadvantage of both these systems is that, when lock-up does in fact occur, one can only draw the conclusion that there is something wrong, but the opposite is not the case. When there is no lock-up, the anti-skid system appears to be working in some way, but one cannot be sure that it is also working correctly. Another big disadvantage is that the testing stands as described above, are only suitable to test the relatively simple anti-skid systems of the "older" generation, which detect an occurring lock-up tendency of a wheel and cannot be used for fully testing the more modern anti-skid systems which continuously sense the respective rotating speeds of all roadwheels and compare these sensed speed with each other. In the modern systems, an electronic control system produces control signals for controlling the braking force of the respective wheels in such a way that the rotational speeds of each of the various roadwheels are equalized, so that lock-up is not only prevented, but the car can be kept fully under full control during the actual braking process.

SUMMARY OF THE INVENTION

The objective of the present invention is to produce a method which makes it possible to test the operation of an ABS with an ordinary roller test bench which has been constructed in a simple manner.

The method proposed, according to the present invention, is based on the idea of producing a difference in rotational speed between at least one of the pairs of rollers and the other(s) and observing the response of the ABS to this produced difference.

One can bring about a certain difference in speed of rotation between at least one of the roller pairs and the other(s) prior to braking of the rollers. During the braking the ABS must then react to the difference in speed of rotation by trying to equalize the speeds of rotation in the for the system's characteristic way.

It is also possible, starting from essentially equal speeds of rotation, to try to change the speeds of rotation of the individual pairs of rollers during braking of the rollers, by influencing them from the roller test bench. The ABS must then react to this influence by keeping the respective speeds of rotation equal.

Another possibility is to drive at least one of the (pairs of) rollers with a predetermined rotation speed and the others with a predetermined torque. When the brakes then are applied the anti-skid system must, when it is operating correctly, try to equalize the speed of the rollers which are driven with the predetermined torque to the speed with which the first-mentioned roller is driven. The way in which this occurs gives a good indication about the condition of the anti-skid system. Of course this test can be carried out with different values of the first mentioned speed and of the torque value.

The method can be carried out starting from essentially equal initial speeds of rotation for rollers or pairs of rollers which are not interconnected. The (pairs of) rollers are given a predetermined, possibly differing mass inertia during or before braking of the rollers, and in particular the way in which the anti-skid system keeps or tries to keep the respective speeds of rotation equal is then observed.

The (pairs of) rollers can also be driven individually to different speeds of rotation before the commencement of the test. However, it is also possible that after the commencement of the test the individual (pairs of) rollers are driven by a motor in differing ways, or that after the commencement of the test the individual (pairs of) rollers are braked in differing ways by means of an auxiliary brake.

The invention also relates to a roller testing stand for carrying out the above described methods. It is very simple to modify existing modern roller testing stands for this purpose. Such a stand can comprise means for individually driving the respective pairs of rollers. The means may comprise driving motors, capable of delivering a predetermined output torque which varies in a known manner as a function of its rotation speed. Each pair of the rollers can be connected by means of a clutch to a central drive motor. Furthermore, each pair of the rollers can be provided with an individually operable brake. Finally each (pair of) roller can be provided with an additional mass inertia which may nor may not be added on.

DESCRIPTION OF THE DRAWINGS

The drawing shows schematically a roller test bench with provisions which permit carrying out of the process according to the present invention with its many variations.

DESCRIPTION OF PREFERRED EMBODIMENTS

The roller test bench shown in the figures comprises front pairs of rollers 10 and 12 having the rollers 10a and 10b and 12a and 12b, respectively, and a rear pair of rollers 14 and 16 having rollers 14a and 14b, and 16a and 16b, respectively.

The individual rollers of each of the pairs of rollers are interconnected by means of a driving belt; these driving belts are indicated by 18, 20, 22 and 24.

Each pair of roller also has an individual drive motor. These motors are indicated by 26, 28, 30 and 32. Each pair of rollers has an individual tachogenerator, indicated by 34, 36, 38 and 40.

Finally, each pair of rollers has a brake which can be activated individually; these brakes are indicated by the reference numbers 42, 44, 46 and 48 for the respective pairs of rollers 10, 12, 14 and 16.

There is also a common drive motor with a controllable speed for all the pairs of the rollers indicated by the reference number 50; the tachogenerator coupled to the common drive motor is indicated by the reference number 52.

The outgoing shaft 54 of the motor 50, of which the speed can be controlled in any known way, is coupled to the ingoing shaft of a pulley drive belt system 56, which drives the driving belts 58, 60, 62 and 64. The driving belts through the use of shafts 66, 68, 70 and 72 drive the pairs of rollers 10, 12, 14 and 16. These drives can be interrupted by a suitable clutch on the shaft, which is symbolically indicated by the clutches 74, 76, 78 and 80.

The usual central measuring and control unit is also schematically indicated by the rectangle 82, to which the output signals supplied by the tachogenerators 34, 36, 38, 40 and 52, representing the speeds of rotation of the rollers are fed, as symbolically indicated by outgoing arrows at the generators and ingoing arrows at the unit 82. The unit delivers control signals for the brakes 42, 44, 46 and 48; the clutches 74, 76, 78 and 80 and the motors 26, 28, 30, 32, and 50. This is schematically indicated by ingoing arrows at the relevant components and outgoing arrows at the unit 82.

The testing of an anti-skid system with the method according to the present invention can be carried out in various ways. As in an "ordinary" brake test, the rollers of the four pairs of rollers are brought to a predetermined rotation speed prior to the start of the test, by means of the motors 26, 28, 30 and 32. However, in the present invention, the rollers are not now driven to equal speeds as in the usual test, but it is ensured that specific, defined differences in speeds exist between the rollers.

When the brake pedal of the vehicle to be tested is depressed, the ABS interprets these differences as a certain slip for each wheel, and if the system works correctly, the ABS will try to equalize the various speeds of rotation. The respective speeds of rotation are known from the signals of the tachogenerators 34, 36, 38 and 40, and it is possible to determine in a simple manner how much time elapses before the speeds of rotation are the same, and in what way this final state is reached.

It is possible to control for a number of motors, for instance, the motors 26, 28, 30 and 32 in such a way that they deliver a predetermined torque which varies but little as a function of their rotating speed or to use motors having such a characteristic. Such motors are commercially available any person of ordinary skill will be able to design a suitable control to obtain such a characteristic so that a further description is not necessary. The test is now carried out in such a way that at least one of the pair of rollers, for instance the pair 10, comprising the rollers 10a and 10b is driving with a predetermined velocity, while the other pairs of rollers, thus the pair 12 with the rollers 12a and 12b, the pair 14 with the rollers 14a and 14b, and the pair 16 with the rollers 16a and 16b are driven with a preferably higher velocity and predetermined torque. When the brakes of the vehicle to be tested are applied, the brakes of the wheels resting upon the rollers, which are driven with the predetermined torque should react in such a way that wheelspeed is equalized to the speed of the speed-controlled roller(s) (pair 10). To reach this result within the system tolerances, the ABS must brake against the respective torques if the system is to operate correctly.

The state prevailing before the commencement of the test, in which the rollers have differing rotation speeds, can also be achieved in another way:

The rollers can be driven by means of the common drive motor 50, the transmission 56, the clutches 74, 76, 78, and 80 which can be disengaged for each pair of rollers and which can be switched off for each pair of rollers (clutches 74, 76, 78, and 80) and the drive belts 58, 60, 62, and 64 in such a way that when a speed $n_1$ is reached the clutch 74 switches off the pair of rollers 10, at a speed $n_2$ the clutch 76 switches off the pair of rollers 12, at a speed $n_3$ the clutch 78 switches off the pair of rollers 14, and at a speed $n_4$ the clutch 80 switches off the pair of rollers 16.

In this way the pairs of rollers have differing speeds of rotation at the start of the test.

It is also possible to accelerate the pairs of rollers 10, 12, 14, and 16 all to the same final speed by means of the motor 50; then disconnect them then from the drive by means of the clutches 74, 76, 78 and 80, and thereafter to brake them selectively to a particular speed by means of the brakes 42, 44, 46 and 48 before the test begins.

A final possibility is to drive the rollers to a particular speed by means of the vehicle itself disconnect them; and brake selectively to a particular speed in the above-described way before carrying out the test.

Another starting point for carrying out the process according to the present invention is: to start from a situation in which all rollers are running at the same speed and introduce disruptions in the speeds of rotation from the outside during the test during the braking. For this, the rollers are disconnected from each other after reaching the starting speed or are driven and disconnected from each other when the speed is equal for all rollers. Following this during braking of the vehicle by means of the brakes 42, 44, 46 and 48 additional (external) braking couples (positive braking forces) can be applied to certain rollers as desired, and if necessary according to a particular program. The motors 26, 28, 30 and 32 make it possible to drive certain roller systems as desired and thus to simulate a negative braking force.

When such a "disruption" occurs the ABS will have to ensure that the roller speeds remain equal.

The response of the ABS will thus give information about its action. If, for example, during braking an extra braking couple is exerted on a particular pair of rollers, the braking force exerted by the anti-skid system must decrease by the same value in such a way that the total braking couple on the roller(s) remains the same or becomes so great that all rollers continue to run at the same speed to show the same deceleration.

It is in this way that the running of one or several wheels on a slippery road surface is simulated.

The measurement of roller speed, which is known per se, provides all the information necessary for the analysis of the working of the ABS. The wheel braking power can provide additional information.

It is pointed out that although a number of possibilities are indicated in the above-described embodiment, this need not be the case in a practical embodiment, which applies, in particular, the components or methods used for achieving equal initial speeds of rotation. Instead of disturbing the braking couple on the rollers by means of brakes 42, 44, 46 and 48 (positive braking forces) or motors 26, 28, 30 and 32 (negative braking forces), it is also possible to give the roller (systems) a predetermined, possibly different mass inertia for instance, by means of flywheels which can be connected or disconnected. In order to keep the speeds of the rollers (systems) equal, the ABS will have to adapt the braking forces in proportion to the additional mass inertia (in order to keep the deceleration and thus equalize the speeds).

What is claimed is:

1. A method for testing an anti-skid braking system of a motor vehicle, the motor vehicle having wheels and a brake pedal, comprising the steps of:
   (a) using a roller test bench with at least four rotatably driven rollers, each roller supporting a different wheel of the motor vehicle;
   (b) causing at least one of the rollers to rotate at a rotational speed that is different from rotational speeds of the other rollers;
   (c) operating the brake pedal of the motor vehicle to cause the wheels to experience a braking force being applied by the motor vehicle;
   (d) observing the anti-skid braking system reaction to the braking force applied in said step (c); and
   (e) determining if the anti-skid braking system equalized the rotational speeds of all the rollers.

2. The method as claimed in claim 1, wherein said step (b) causes at least one roller to rotate at a rotational speed that is different from the rotational speeds of the other rollers prior to executing said step (c).

3. The method as claimed in claim 2, wherein said step (b) causes each individual roller to rotate at a rotational speed which is distinct from the rotational speeds of the other rollers prior to executing said step (c).

4. The method as claimed in claim 1, wherein said step (b) causes at least one roller to rotate at a rotational speed that is different from the rotational speeds of the other rollers simultaneously with execution of said step (c).

5. The method as claimed in claim 4, wherein said step (b) causes each individual roller to rotate at a rotational speed which is distinct from the rotational speed of the other rollers during execution of said step (c).

6. The method as claimed in claim 4 further comprising the steps of:
   (f) causing each individual roller to experience an auxiliary braking force being applied from an auxiliary brake during execution of said step (c).

7. The method as claimed in claim 1, wherein said step (b) causes at least one roller to rotate at a predetermined rotational speed that is different from the rotational speeds of the other rollers by applying a predetermined torque to the other rollers.

8. A roller test bench for testing an anti-skid braking system of a motor vehicle, the motor vehicle having wheels and a brake pedal, comprising:
   bench means for supporting the motor vehicle, said bench means having at least four rotatably driven rollers, at least one roller supporting a different wheel of the motor vehicle;
   driving means, operatively connected to said bench means, for driving at least one of said rollers to rotate at a rotational speed that is different from rotational speeds of the other rollers;
   sensing means, operatively connected to said bench means, for sensing a reaction of the anti-skid braking system of the motor vehicle to a braking force applied by the brake pedal of the motor vehicle; and
   processing means, operatively connected to said sensing means, for determining if the anti-skid system of the motor vehicle equalized the rotational speeds of all said rollers.

9. The roller bench as claimed in claim 8, wherein said driving means drive each individual roller separately.

10. The roller bench as claimed in claim 9, wherein said driving means comprises driving motors having rotational speeds, each driving motors delivering a predetermined output torque as a function of the rotational speed of the driving motor.

11. The roller bench as claimed in claim 8, wherein each wheel of the motor vehicle is supported by a pair of rollers.

12. The roller bench as claimed in claim 11, further comprises a clutch connected between each individual pair of rollers and said driving means.

13. The roller bench as claimed in claim 11, further comprises an auxiliary brake operatively connected to each individual pair of rollers.

* * * * *